US008179002B2

United States Patent
Mancuso et al.

(10) Patent No.: US 8,179,002 B2
(45) Date of Patent: May 15, 2012

(54) AXIAL COOLED GENERATOR

(75) Inventors: Thomas Mancuso, Niskayuna, NY (US); Sayantan Bhar, Karnataka (IN); Sandip Shahaji Hirade, Karnataka (IN); Peter Anthony DiLorenzo, Charlton, NY (US); Andrew David Maduskuie, Greenville, SC (US); Sadeo Ramtahal, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/076,610

(22) Filed: Mar. 31, 2011

(65) Prior Publication Data

US 2011/0210560 A1    Sep. 1, 2011

(51) Int. Cl.
*H02K 9/00*     (2006.01)
(52) U.S. Cl. ............ 310/60 A; 310/55; 310/58; 310/59; 310/60 R
(58) Field of Classification Search ............... 310/60 A, 310/60 R, 52, 56, 58–59, 89, 55
See application file for complete search history.

(56) References Cited

U.S. PATENT DOCUMENTS

| | | | | |
|---|---|---|---|---|
| 1,761,387 | A * | 6/1930 | Gay | 310/52 |
| 4,087,707 | A * | 5/1978 | Shinoda et al. | 310/63 |
| 5,214,324 | A * | 5/1993 | Holmes | 310/52 |
| 6,188,153 | B1 * | 2/2001 | Hokanson | 310/52 |
| 6,657,357 | B2 * | 12/2003 | Boardman et al. | 310/216.114 |
| 7,548,008 | B2 | 6/2009 | Jansen et al. | |
| 2003/0062780 | A1 | 4/2003 | Kaneko et al. | |
| 2005/0067905 | A1 * | 3/2005 | Maney et al. | 310/58 |
| 2007/0103027 | A1 | 5/2007 | Jansen et al. | |
| 2007/0274838 | A1 * | 11/2007 | Bagepalli et al. | 416/245 R |
| 2010/0289349 | A1 | 11/2010 | Maduskuie et al. | |

FOREIGN PATENT DOCUMENTS

SU         1283433 A  *  1/1987

* cited by examiner

*Primary Examiner* — Quyen Leung
*Assistant Examiner* — Jose Gonzalez Quinones
(74) *Attorney, Agent, or Firm* — James W. Pemrick; Ernest G. Cusick; Frank A. Landgraff (57) ABSTRACT

A wind turbine having a generator is provided. The generator includes a rotor and a stator having a stator lamination, one or more flange rings and one or more core rings. The stator lamination includes a plurality of axial flow passages and the one or more core rings include a plurality of core ring axial flow passages that are aligned with the plurality of axial flow passages in the stator lamination. The plurality of axial flow passages in the stator lamination have a substantially triangular cross-sectional shape.

23 Claims, 9 Drawing Sheets

AXIAL COOLED GENERATOR

BACKGROUND OF THE INVENTION

The subject matter disclosed herein relates to the art of generators and, more particularly, to a generator including a cooled stator.

Some conventional generators utilize a radial air flow to cool internal components. In particular, axial air flows are directed through a stator portion of the generator. The stator includes a plurality of passages that serve as a conduit for a cooling airflow. The cooling air flow is passed, in one direction, through the plurality of passages to conduct heat away from the stator.

Smaller generators, such as those employed in wind turbines, may also employ stators having axial flow passages. This method can be particularly effective in machines with shorter stators than longer ones. The challenge with the axial cooling however can be the reduced heat transfer surface area relative to a radial cooled design.

BRIEF DESCRIPTION OF THE INVENTION

According to one aspect of the invention, a generator is provided. The generator includes a rotor and a stator having a stator lamination, one or more flange rings and one or more core rings. The stator lamination includes a plurality of axial flow passages and the one or more core rings include a plurality of core ring axial flow passages that are aligned with the plurality of axial flow passages in the stator lamination. The plurality of axial flow passages in the stator lamination have a substantially triangular cross-sectional shape.

According to another aspect of the invention, a wind turbine having a generator is provided. The generator includes a rotor and a stator having a stator lamination, one or more flange rings and one or more core rings. The stator lamination includes a plurality of axial flow passages and the one or more core rings include a plurality of core ring axial flow passages that are aligned with the plurality of axial flow passages in the stator lamination. The plurality of axial flow passages in the stator lamination have a substantially triangular cross-sectional shape.

According to yet another aspect of the invention, a generator is provided having a rotor and a stator including a stator lamination, one or more flange rings and one or more core rings. The stator lamination includes a plurality of axial flow passages and the one or more core rings include a plurality of core ring axial flow passages that are aligned with the plurality of axial flow passages in the stator lamination. The plurality of axial flow passages in the stator lamination have at least one of, a substantially triangular cross-sectional shape, a triangular cross-sectional shape, an oval cross-sectional shape, a circular cross-sectional shape, or a polygonal cross-sectional shape.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which.

The detailed description explains embodiments of the invention, together with advantages and features, by way of example with reference to the drawings.

DETAILED DESCRIPTION OF THE INVENTION

Figure 1:
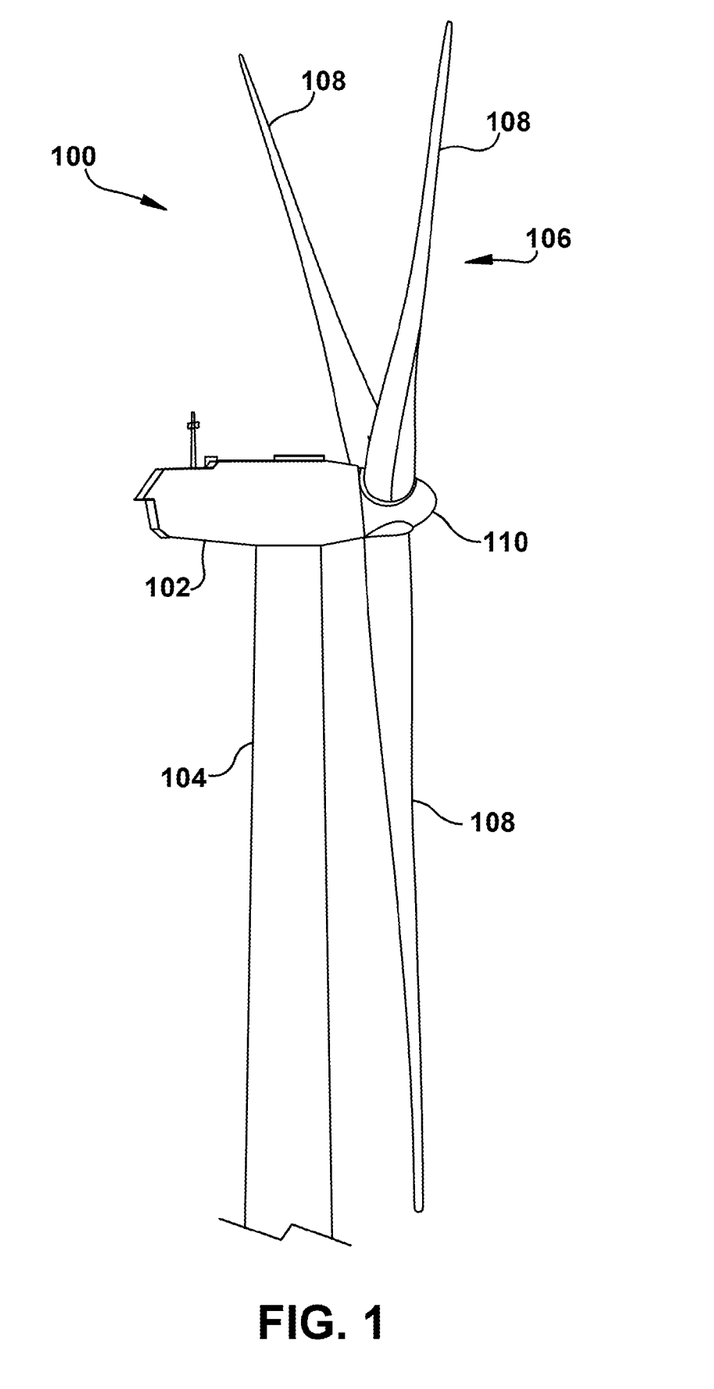
FIG. 1 is a partial side elevational illustration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
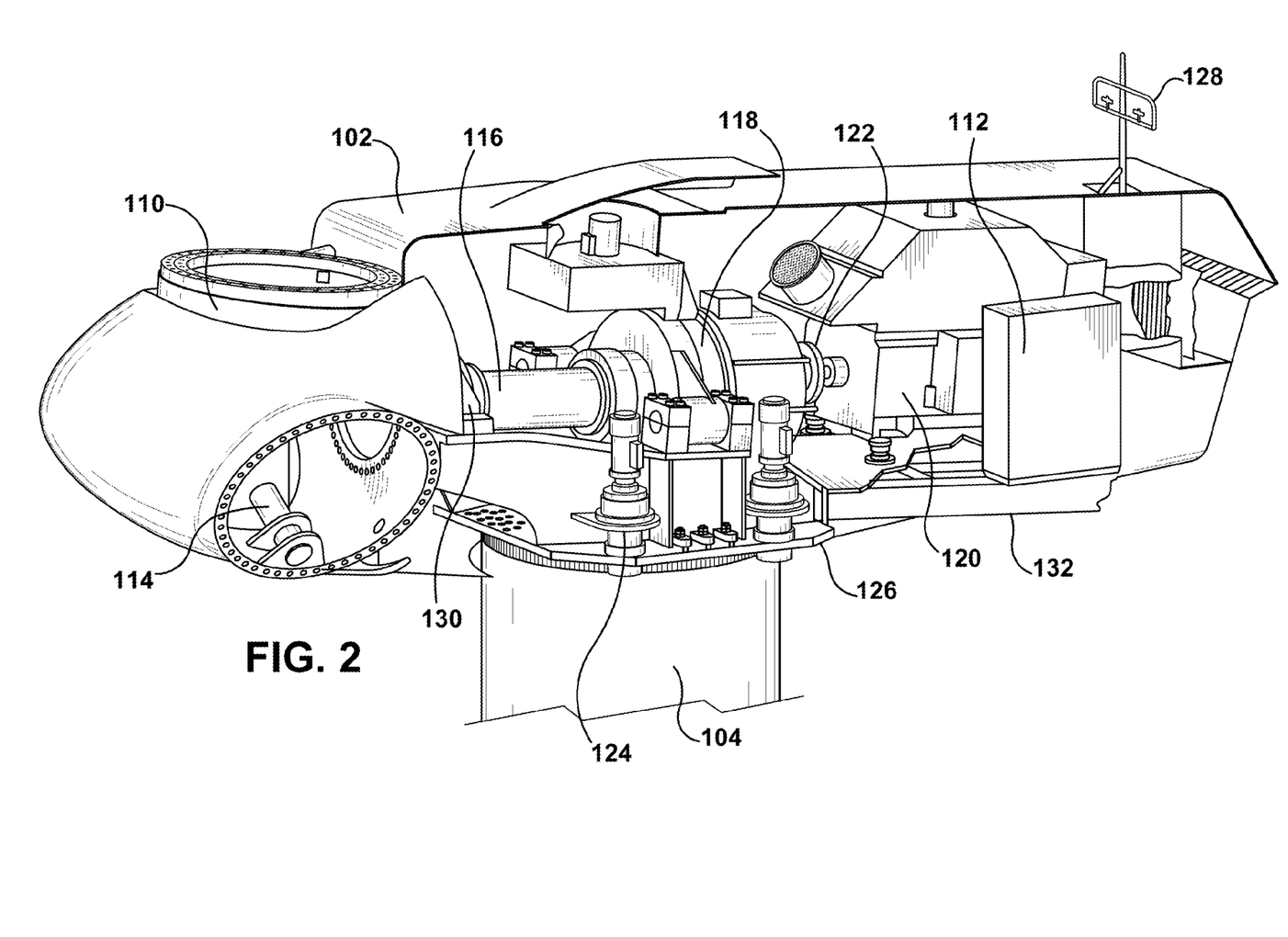
FIG. 2 is a partial perspective illustration of the interior of the nacelle of the wind turbine of FIG. 1.

Referring to FIG. 2, various components are housed in nacelle 102 or in tower 104 of wind turbine 100. The height of tower 104 is selected based upon factors and conditions known in the art. In some configurations, one or more microcontrollers within control panel 112 comprise a control system used for overall system monitoring and control. Alternative distributed or centralized control architectures are used in some configurations. A variable blade pitch drive 114 may be provided to control the pitch of blades 108 (not shown in FIG. 2) that drive hub 110 as a result of wind. The pitch angles of blades 108 may be individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and (in some configurations), at an opposite end of shaft 116 to a gear box 118. Gearbox 118 drives a high-speed shaft of generator 120. In other configurations, the gear box and generator are integrated into one unit. The high-speed shaft (not identified in FIG. 2) is used to drive generator 120, which is mounted on mainframe 132. In some configurations, rotor torque is transmitted via coupling 122. In some configurations of the present invention, generator 120 is mounted directly on the gear box. Yaw drive 124 and yaw deck 126 provide a yaw orientation system for wind turbine 100. A meteorological boom 128 provides information for a turbine control system, which may include wind direction and/or wind speed. In some configurations, the yaw system is mounted on a flange provided atop tower 104.

Figure 3:
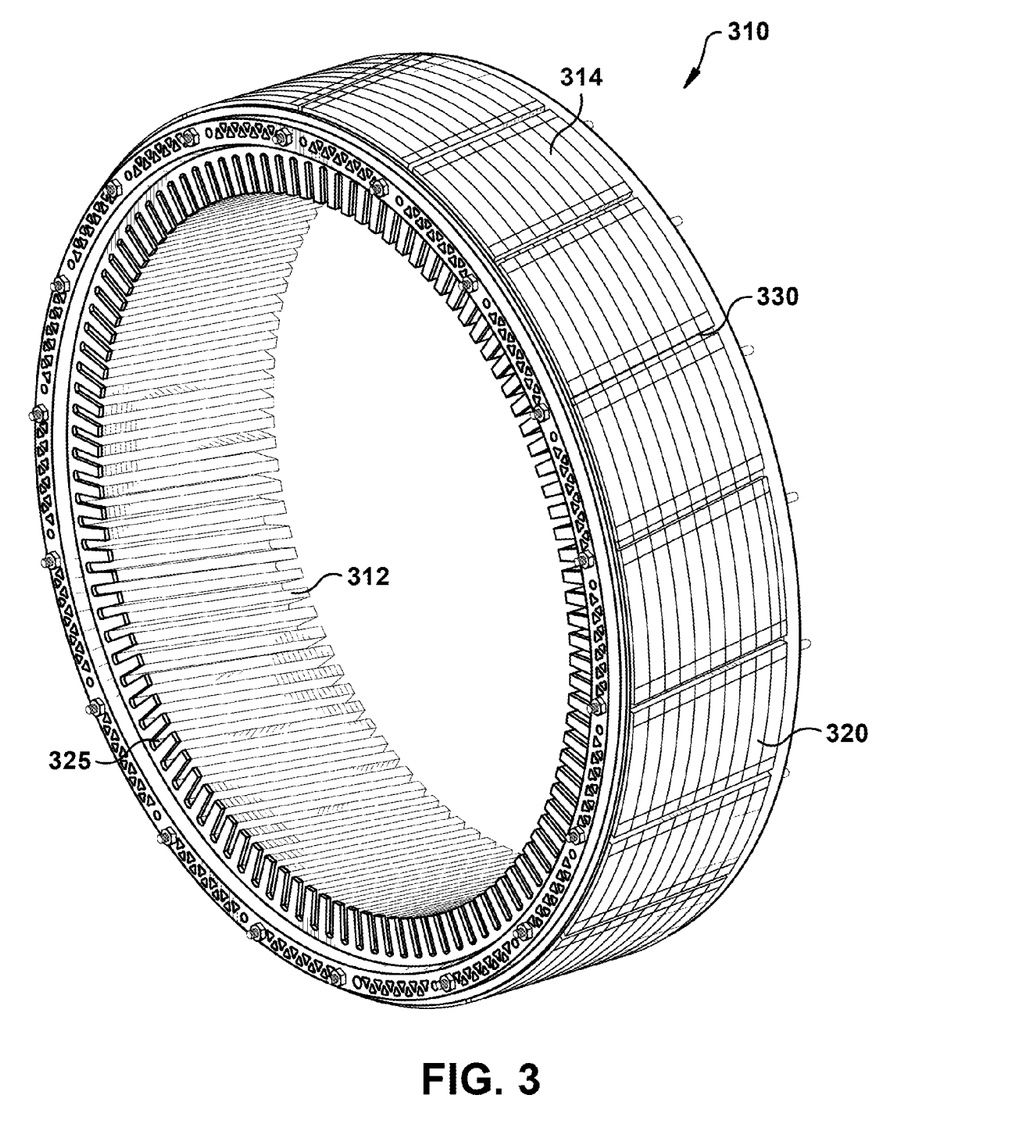
FIG. 3 is a partial, perspective illustration of a generator according to an aspect of the present invention.

FIG. 3 is a partial, perspective illustration of a stator core 310 constructed in accordance with an aspect of the present invention. The stator core 310 is co-axially disposed relative to a rotor (not shown in FIG. 3). As shown, stator core 310 is formed from a plurality of stacked laminations 320. Stator core 310 includes a plurality of slots/grooves 325 formed on inner diametric portion 312 and a plurality of compression bolt slots 330 formed about outer diametric portion 314.

Figure 4:
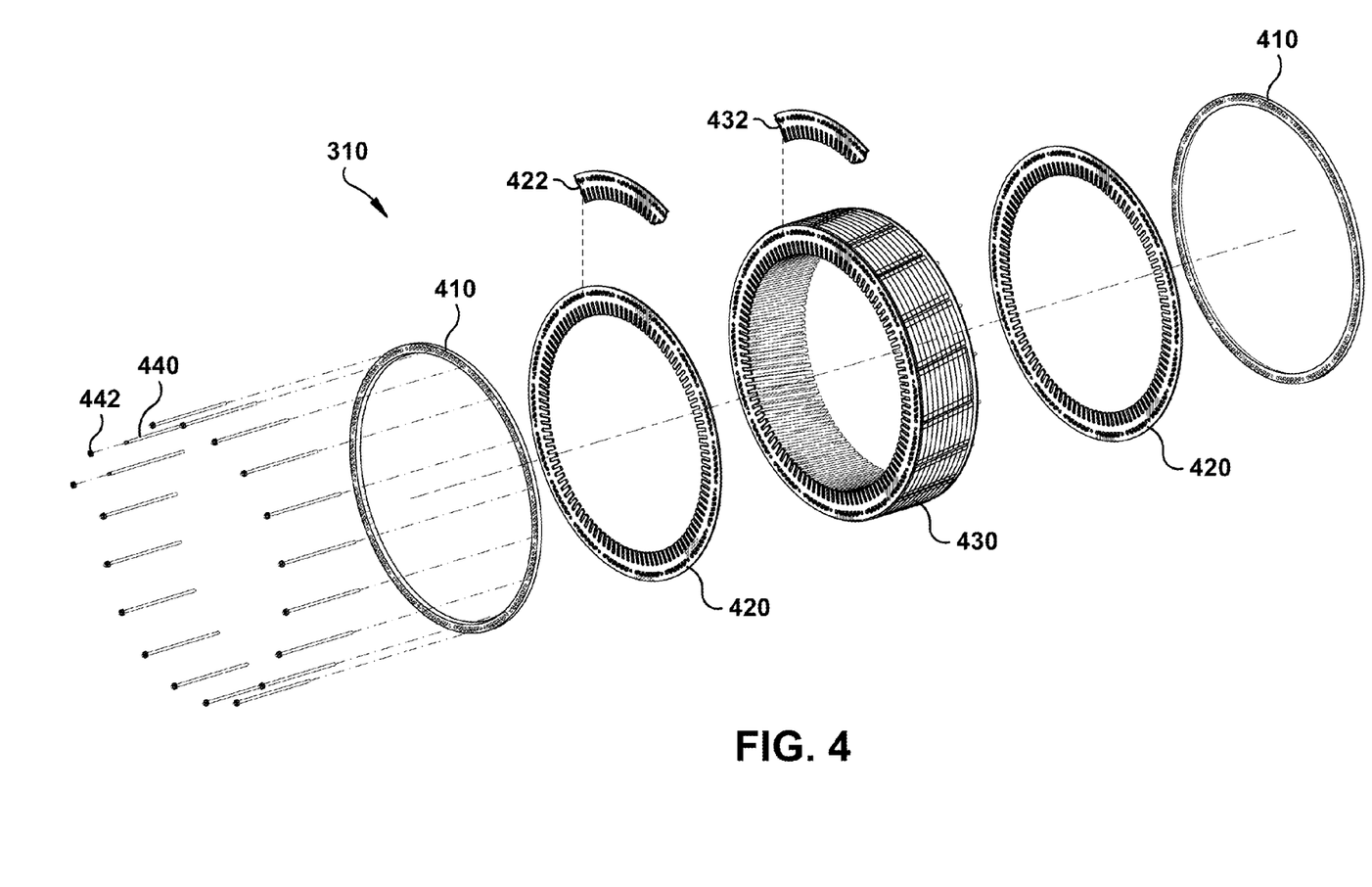
FIG. 4 illustrates a partial, exploded illustration of a generator according to an aspect of the present invention.

FIG. 4 illustrates a partial, exploded illustration of stator core 310. The stator may include core rings 410, flange ring 420, and stator lamination stack 430. The flange ring 420 is formed from a plurality of flange segments 422. The stator lamination stack 430 is formed from a plurality of layers of core laminations or segments 432. The stack of elements 410, 420, 430 are held together with a plurality of core studs 440 and fasteners 442. The core studs can be formed of rods that are threaded on both ends and the fasteners can be any suitable nut. With this arrangement, the core rings 410 serve to press the plurality of laminations/stacks 420, 430 together to form one solid body for structural and vibrational purposes. It is to be understood that any other suitable fastening arrangement, using nuts, bolts and/or studs, could also be used.

Figure 5:
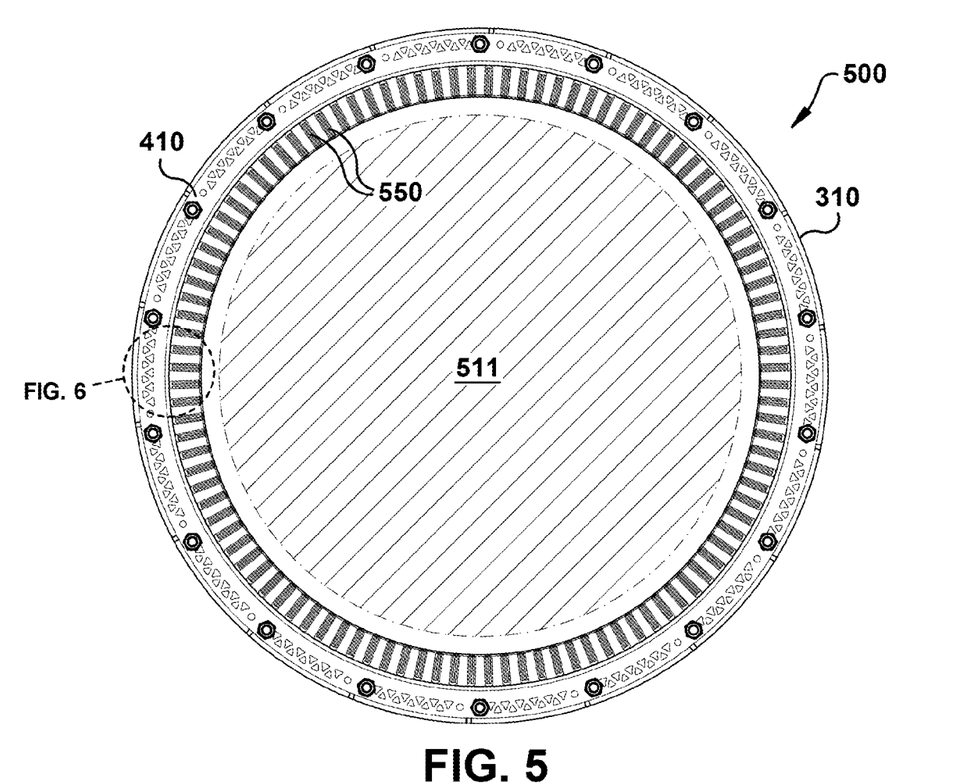
FIG. 5 illustrates an end view illustration of a generator according to an aspect of the present invention.
Figure 6:
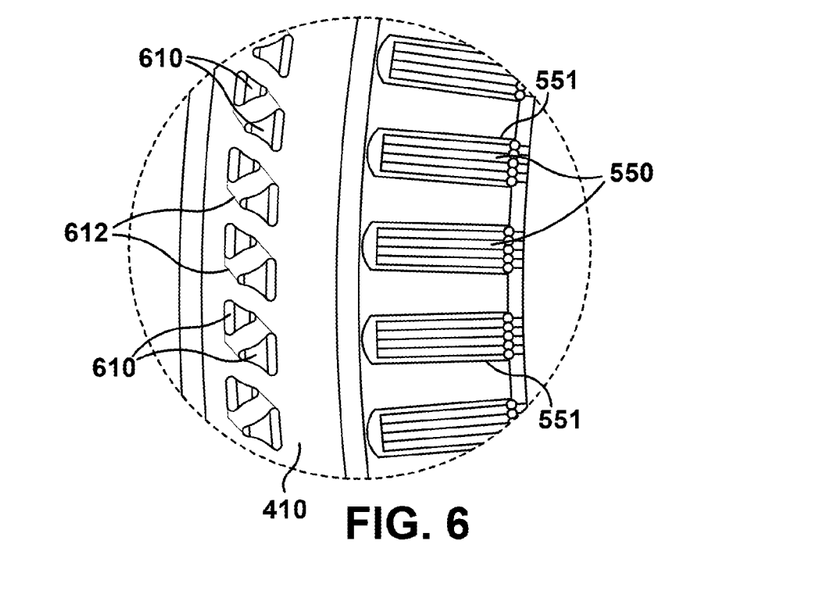
FIG. 6 illustrates an enlarged view of a portion of the end view illustration of a generator in FIG. 5, according to an aspect of the present invention.

FIG. 5 illustrates an end view illustration of the generator 500, which includes stator 310 and rotor 511. The core ring 410 is placed on both outer axial ends of the stator 310. A plurality of slots 550 for stator windings are defined by openings in the various layers of the stator lamination stack. FIG. 6 illustrates an enlarged view of one portion of FIG. 5. A plurality of axial flow passages 610 are formed in each of the flange ring 420 and stator lamination 430. The axial flow passages 610 provide conduits for a cooling air flow that passes through stator 310. Each core ring 410 also include axial flow passages 612, and the core ring axial flow passages 612 may be sized to encompass two of the axial flow passages 610. Each of the axial flow passages 610 has a substantially triangular shape in cross-section, and this shape improves the surface area available for heat transfer while also maintaining good structural strength without substantially impeding magnetic flux. The triangular shape of the axial flow passages also results in the core ring 410 having a truss-like structure, which leads to good structural strength. However, other cross-sectional shapes for the axial flow passages could also be used which include, but are not limited to, triangular, oval, circular, and polygonal.

Figure 7:
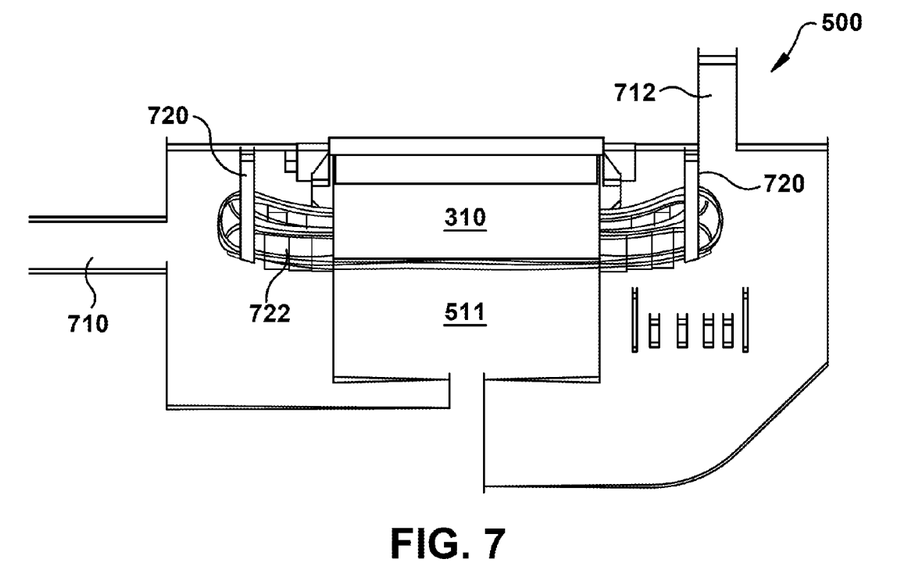
FIG. 7 illustrates a schematic view of a generator, according to an aspect of the present invention.

FIG. 7 illustrates a schematic view of generator 500. One or more inlets 710 are used for directing a cooling medium (e.g., air or hydrogen, etc.) into the generator 500. The cooling medium will flow through the generator, and a portion of this cooling medium will pass through the gap between the rotor 511 and stator 310, and then exit through one or more outlets 712. Another portion of this cooling medium will pass over end winding support rings 720, as well as through the end winding portion 722 of the stator coil. The end winding support rings 720 are configured to direct flow over and through the end windings 722, and this results in improved cooling flow over the end windings 722.

Figure 8:
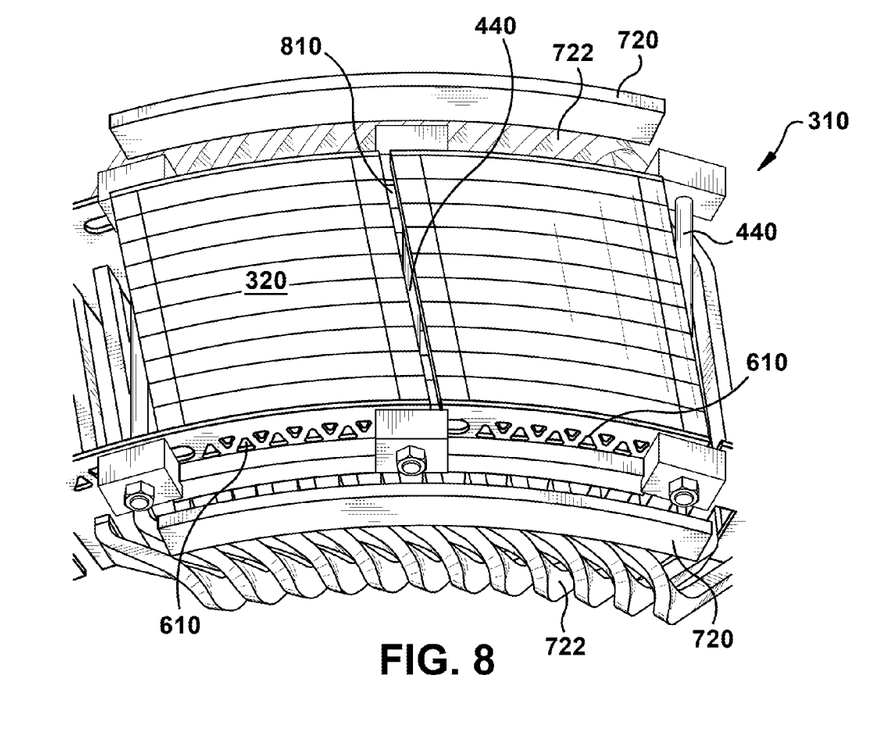
FIG. 8 illustrates a partial perspective view of a stator, according to an aspect of the present invention.

FIG. 8 illustrates a partial perspective view of stator 310. The end winding support rings 720 assist in directing cooling medium flow over and through end windings and through axial flow passages 610. The end winding support rings 720 may also be used to bind all the end windings together to provide structural support. In addition a plurality of core stud slots 810 are provided to allow passage of core studs 440 in stator 310. The core stud slots are configured to also allow passage of the cooling medium. In some applications, bolting blocks 820 may be used, but in other applications the core ring 410 can be used in place of the bolting blocks, or both may be used together. The passage of cooling medium through core stud slots 810 improves cooling of stator 310.

Figure 9:
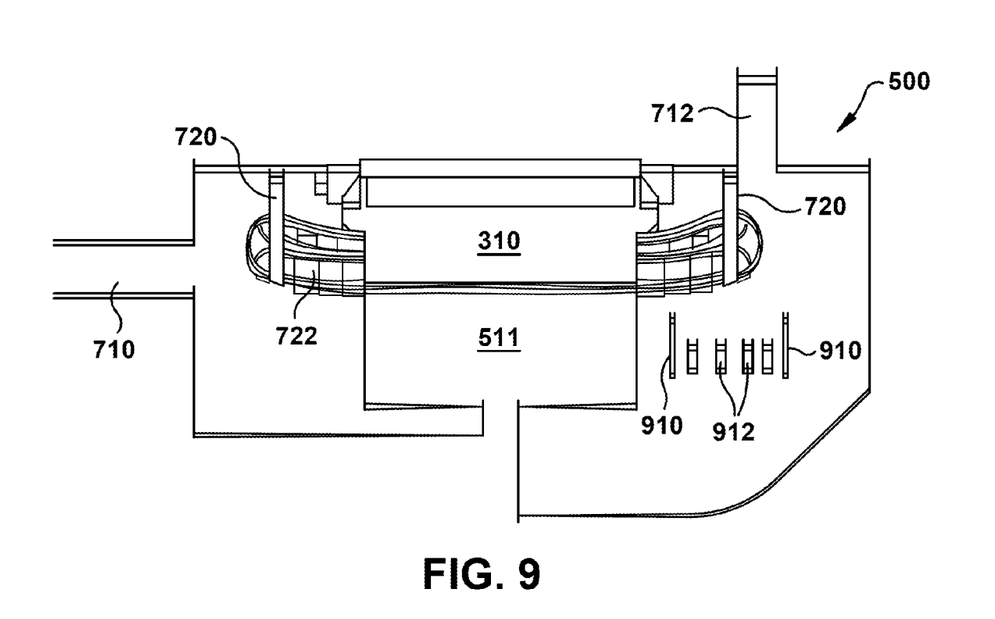
FIG. 9 illustrates a partial schematic view of a generator, according to an aspect of the present invention.

FIG. 9 illustrates a partial schematic view of generator 500. The connection ring supports 910 support the connection rings 912, and are configured to control flow direction of the cooling medium over the connection rings 912. The connection ring supports 910 may also be used to bind the connection rings together and to provide structural support. As can be seen, the connection ring supports 910 extend radially past the connection rings 912, and this channels cooling medium through and over the connection rings. The connection ring supports 910 also include axial support members (not shown) extending therebetween which also support connection rings 912.

Figure 10:
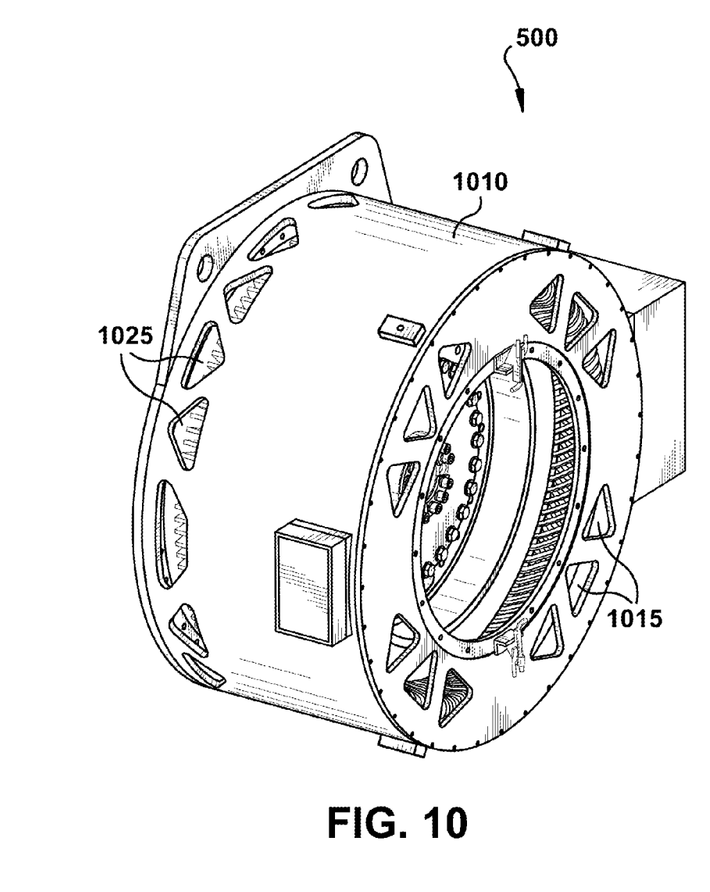
FIG. 10 illustrates a perspective view of an exhaust housing for a generator, according to an aspect of the present invention.
Figure 11:
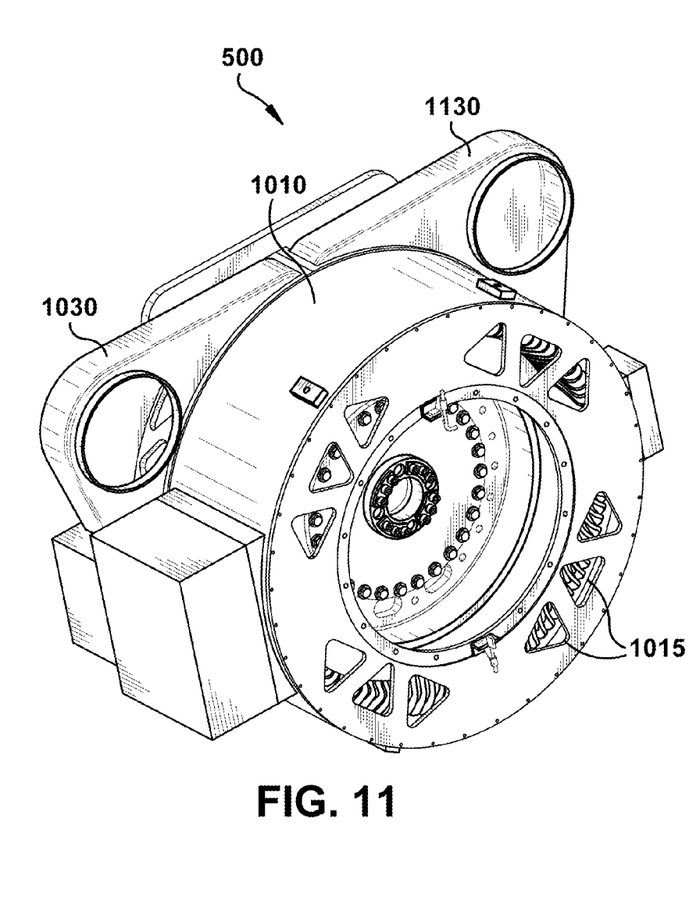
FIG. 11 illustrates a perspective view of an exhaust housing for a generator, according to an aspect of the present invention.

FIG. 10 and FIG. 11 illustrate perspective views of an exhaust housing that facilitates substantially uniform flow of the cooling medium through generator 500. The housing 1010 includes a plurality of input openings 1015 through which input cooling medium flow can be directed. The cooling medium will then pass through the stator and/or rotor and exit through exit openings 1025. One or more manifolds 1130 can be used to collect the cooling medium exiting from a group of exit openings 1025. The input and exit openings may have a substantially triangular shape, and this shape provides good structural rigidity and desirable levels of cooling medium flow. The triangular shape of the input and exit openings also results in a housing having a truss-like structure, which leads to good structural strength.

Figure 12:
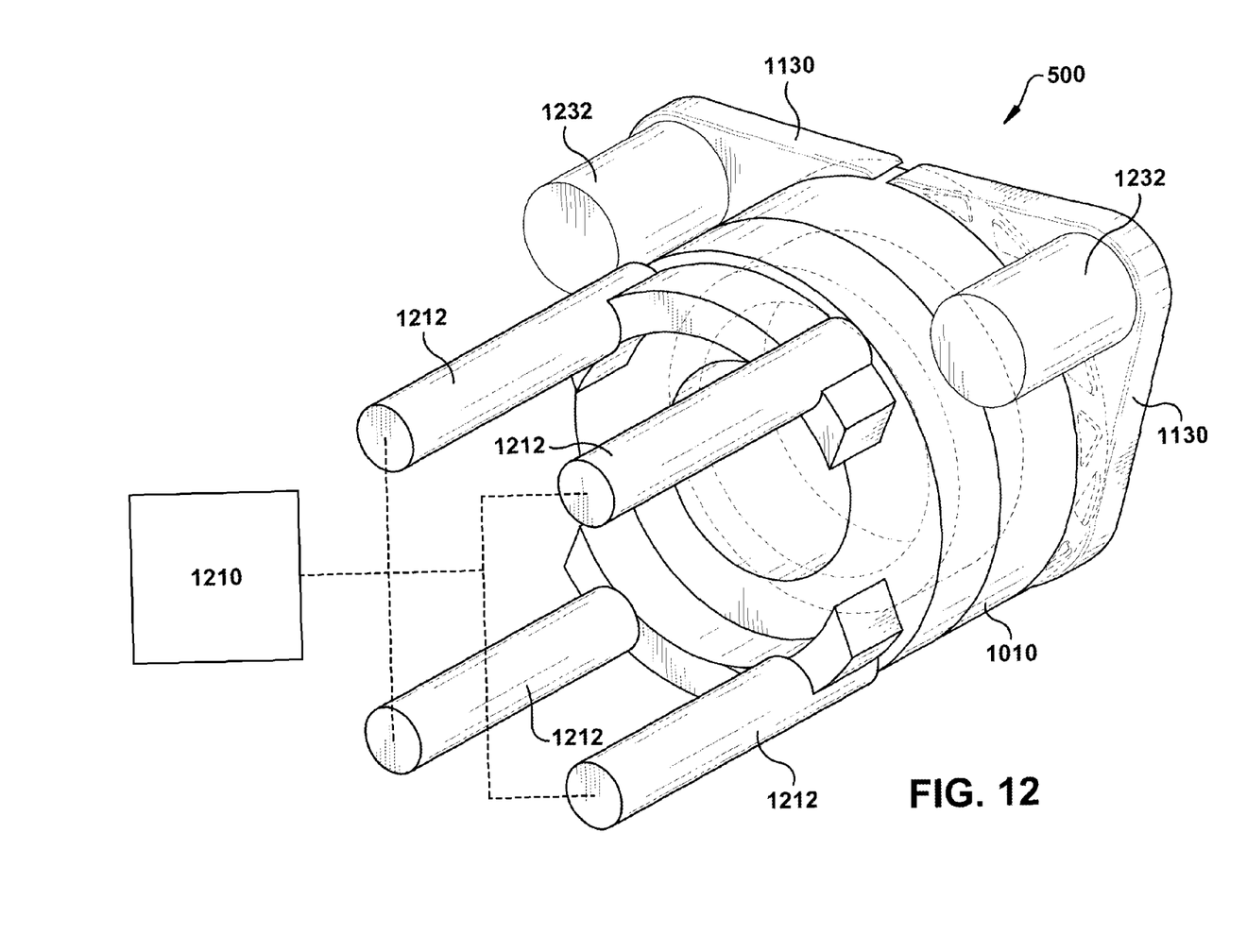
FIG. 12 illustrates a simplified schematic view of a generator having a plurality of input and output connections for cooling medium flow, according to an aspect of the present invention.

FIG. 12 illustrates a simplified schematic view of generator 500 having a plurality of input and output connections for cooling medium flow. A blower or fan 1210 can be connected to the input conduits 1212, and the input conduits 1212 are connected to the input openings 1015 in housing 1010. It is to be understood that one or more blowers 1210 can be connected to one or more input conduits 1212, and the blower is also in communication with a source of cooling medium (e.g., air or hydrogen). The cooling medium passes from the blower 1210 through input conduits 1212 and into the stator and/or rotor via input openings 1015. The cooling medium exits out of exit openings 1025, manifolds 1130 and then exit conduits 1232. The blower 1210 can be located upstream of the generator and helps to ensure cooling medium pressurization and reduces the possibility of dust or other impurity contamination within generator 500.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A generator comprising:
   a rotor;

a stator including a stator lamination, one or more flange rings and one or more core rings;

wherein the stator lamination includes a plurality of axial flow passages and the one or more core rings include a plurality of core ring axial flow passages that are aligned with the plurality of axial flow passages in the stator lamination, and wherein each axial flow passage of the plurality of axial flow passages in the stator lamination has a substantially triangular cross-sectional shape, the plurality of axial flow passages are configured in a substantially continuous circumferential array and the plurality of axial flow passages channel substantially all of a cooling medium flow that passes through the stator lamination.

2. The generator according to claim 1, wherein the substantially triangular cross-sectional shape results in a truss-like structure.

3. The generator according to claim 1, wherein the cooling medium is passed through the plurality of axial flow passages in the stator lamination and the plurality of core ring axial flow passages, and wherein the cooling medium is either air or hydrogen.

4. The generator according to claim 3, further comprising:
a plurality of end windings;
one or more end winding support rings configured to channel and direct flow over and between the plurality of end windings.

5. The generator according to claim 3, further comprising:
a plurality of connection rings;
one or more connection ring supports for supporting the plurality of connection rings;
wherein the one or more connection rings supports are configured to channel and direct flow over and between the plurality of connection rings.

6. The generator according to claim 3, further comprising:
a housing having a plurality of input openings and a plurality of exit openings, wherein the shape of the plurality of input openings and the plurality of exit openings is a substantially triangular shape.

7. The generator according to claim 6, wherein the substantially triangular shape results in a truss-like structure.

8. The generator according to claim 6, further comprising:
one or more manifolds connected to the housing and in fluid communication with the plurality of exit openings.

9. The generator according to claim 8, further comprising:
one or more input conduits in fluid communication with the plurality of input openings;
one or more exit conduits in fluid communication with the plurality of exit openings;
one or more blowers in fluid communication with the one or more input conduits;
wherein the one or more blowers force the cooling medium into the one or more input conduits.

10. A wind turbine comprising:
a tower;
a nacelle supported by the tower;
one or more rotor blades attached to a hub, wherein the hub is attached to the nacelle;
a generator comprising;
a rotor;
a stator including a stator lamination, one or more flange rings and one or more core rings;
wherein the stator lamination includes a plurality of axial flow passages and the one or more core rings include a plurality of core ring axial flow passages that are aligned with the plurality of axial flow passages in the stator lamination, and wherein each axial flow passage of the plurality of axial flow passages in the stator lamination has a substantially triangular cross-sectional shape, the plurality of axial flow passages are configured in a substantially continuous circumferential array and the plurality of axial flow passages channel substantially all of a cooling medium flow that passes through the stator lamination.

11. The wind turbine according to claim 10, wherein the substantially triangular cross-sectional shape results in a truss-like structure.

12. The wind turbine according to claim 10, wherein the cooling medium is passed through the plurality of axial flow passages in the stator lamination and the plurality of core ring axial flow passages, and wherein the cooling medium is either air or hydrogen.

13. The wind turbine according to claim 12, further comprising:
a plurality of end windings;
one or more end winding support rings configured to channel and direct flow over and between the plurality of end windings.

14. The wind turbine according to claim 12, further comprising:
a plurality of connection rings;
one or more connection ring supports for supporting the plurality of connection rings;
wherein the one or more connection rings supports are configured to channel and direct flow over and between the plurality of connection rings.

15. The wind turbine according to claim 12, further comprising:
a housing having a plurality of input openings and a plurality of exit openings, wherein the shape of the plurality of input openings and the plurality of exit openings is a substantially triangular shape.

16. The wind turbine according to claim 15, wherein the substantially triangular shape results in a truss-like structure.

17. The wind turbine according to claim 15, further comprising:
one or more manifolds connected to the housing and in fluid communication with the plurality of exit openings.

18. The wind turbine according to claim 17, further comprising:
one or more input conduits in fluid communication with the plurality of input openings;
one or more exit conduits in fluid communication with the plurality of exit openings;
one or more blowers in fluid communication with the one or more input conduits;
wherein the one or more blowers force the cooling medium into the one or more input conduits.

19. A generator comprising:
a rotor;
a stator including a stator lamination, one or more flange rings and one or more core rings;
wherein the stator lamination includes a plurality of axial flow passages and the one or more core rings include a plurality of core ring axial flow passages that are aligned with the plurality of axial flow passages in the stator lamination, and wherein the plurality of axial flow passages in the stator lamination have at least one of, a substantially triangular cross-sectional shape, a triangular cross-sectional shape, or an oval cross-sectional shape, the plurality of axial flow passages are configured in a substantially continuous circumferential array and the plurality of axial flow passages channel substantially all of a cooling medium flow that passes through the stator lamination.

20. The generator of claim 19, wherein the generator is part of a wind turbine.

21. The generator according to claim 1, wherein each of the core ring axial flow passages are configured to cover two of the axial flow passages in the stator lamination.

22. The generator according to claim 10, wherein each of the core ring axial flow passages are configured to cover two of the axial flow passages in the stator lamination.

23. The generator according to claim 19, wherein each of the core ring axial flow passages are configured to cover two of the axial flow passages in the stator lamination.

* * * * *